(12) United States Patent
Hwang et al.

(10) Patent No.: US 10,151,450 B2
(45) Date of Patent: Dec. 11, 2018

(54) FLEXIBLE DRIVING DEVICE

(71) Applicant: Chang-soon Hwang, Incheon (KR)

(72) Inventors: Chang-soon Hwang, Incheon (KR); Sun-jong Kim, Seoul (KR)

( * ) Notice: Subject to any disclaimer, the term of this patent is extended or adjusted under 35 U.S.C. 154(b) by 141 days.

(21) Appl. No.: 15/101,084

(22) PCT Filed: May 14, 2015

(86) PCT No.: PCT/KR2015/004820
§ 371 (c)(1),
(2) Date: Jun. 2, 2016

(87) PCT Pub. No.: WO2015/174744
PCT Pub. Date: Nov. 19, 2015

(65) Prior Publication Data
US 2016/0305633 A1    Oct. 20, 2016

(30) Foreign Application Priority Data

May 14, 2014   (KR) ........................ 10-2014-0057906

(51) Int. Cl.
*H05B 37/02* (2006.01)
*F21V 14/02* (2006.01)
*F21V 14/08* (2006.01)
*G09F 13/02* (2006.01)
*G09F 15/00* (2006.01)
(Continued)

(52) U.S. Cl.
CPC .............. *F21V 14/02* (2013.01); *F21V 14/08* (2013.01); *G09F 13/02* (2013.01); *G09F 15/0006* (2013.01); *H02N 10/00* (2013.01); *H05B 33/0803* (2013.01); *H05B 33/0854* (2013.01); *H05B 33/0896* (2013.01); *H05B 37/02* (2013.01); *H05B 37/0209* (2013.01); (Continued)

(58) Field of Classification Search
CPC .......... F21V 14/02; F21V 14/08; G09F 13/02; G09F 15/0006; H02N 10/00; H05B 33/0803; H05B 33/0854; H05B 33/0896; H05B 37/02; H05B 37/0209; H05B 37/0227
See application file for complete search history.

(56) References Cited

FOREIGN PATENT DOCUMENTS

JP    2012-064441 A    3/2012
JP    2013-110074 A    6/2013
(Continued)

*Primary Examiner* — Mary Ellen Bowman
(74) *Attorney, Agent, or Firm* — Patent Office of Dr. Chung Park

(57) ABSTRACT

A flexible driving device includes: a first driving unit adapted to maintain a specific shape at room temperature; and a second driving unit adapted to be bent at a preset temperature or higher according to an electric signal supplied from an outside, thereby adjusting at least one of a direction and an angle of an object to be driven, which is coupled to the driving device. It is possible to adjust the direction and angle of the object to be driven, which is coupled to the driving device, install the driving device at different places by changing the shape thereof, change brightness and angle of a light source or a panel to an optimum brightness or direction on the basis of the user's movement and peripheral environment information, and change the brightness and angle of the light source or the panel according to a command received from the outside.

20 Claims, 10 Drawing Sheets

(51) Int. Cl.
*H02N 10/00* (2006.01)
*H05B 33/08* (2006.01)
*F21V 23/04* (2006.01)
*F21Y 105/00* (2016.01)

(52) U.S. Cl.
CPC ...... *H05B 37/0227* (2013.01); *F21V 23/0471* (2013.01); *F21Y 2105/00* (2013.01)

(56) References Cited

FOREIGN PATENT DOCUMENTS

| | | | |
|---|---|---|---|
| JP | 2013-118076 A | | 6/2013 |
| JP | 2013118076 A | * | 6/2013 |
| KR | 10-2011-0048640 A | | 5/2011 |

* cited by examiner

FLEXIBLE DRIVING DEVICE

CROSS-REFERENCE TO PRIOR APPLICATION

This application is a national Stage Patent Application of PCT International Patent Application No. PCT/KR2015/004820, filed on May 14, 2015, under 35 U.S.C. § 371, which claims priority of Korean Patent Application No. 10-2014-0057906, filed on May 14, 2014, which are all hereby incorporated by reference in their entirety.

TECHNICAL FIELD

The present invention relates to a flexible driving device, and more particularly, to a flexible driving device coupled to a light source, a panel, or the like to adjust a direction and an angle of an object to be driven, which is coupled thereto.

BACKGROUND ART

A lighting device includes a light source having various colors and a support member for supporting the light source to lighten a dark place.

Recently, an LED or OLED device which is a light source used for the lighting device and may increase illumination while reducing power consumption has replaced conventional halogen light sources.

With the development of such the light sources, a lighting device having a sensor coupled thereto for performing various additional functions such as cutting off a supply of power when there is no user's movement, or being rotated by a motor to lighten a moving object has been developed, and with the diversification of advertising media, a function of an advertising panel, in which a light emitting unit is coupled to a panel on which advertising information is displayed at an outside thereof to increase identification of advertising, has been improved as well.

In this regard, such a conventional lighting device requires a separate pivoting device such as a motor to change an illumination angle, and is pivoted within only a limited path by a pivotding shaft even when including the pivoting device, such that it may not irradiate light to objects at various positions. Further, since a shape of the conventional lighting device is not changed, the conventional lighting device has a limitation in that it should be installed only at a limited place.

Meanwhile, even in the case of the conventional advertising panel, the advertising information is displayed on a flat-shaped panel, and as a result, may be identified only in a specific direction. Therefore, inorder to identify the advertising information in various directions, there is a problem in that a separate rotation device for rotating the panel is required.

DISCLOSURE

Technical Problem

Accordingly, it is an object of the present invention to provide a flexible driving device which is capable of variously adjusting a direction and an angle of an object to be driven.

In addition, another object of the present invention is to provide a flexible driving device that can be installed at different places by changing a shape of the driving device.

Further, another object of the present invention is to provide a flexible driving device which is capable of changing brightness and an angle of a light source or a panel to optimal brightness and direction on the basis of a user's movement and surrounding environmental information.

Furthermore, another object of the present invention is to provide a flexible driving device which is capable of changing brightness and an angle of a light source or a panel according to a command received from an outside.

Technical Solution

In order to accomplish the above objects, there is provided a flexible driving device, including: a first driving unit adapted to maintain a specific shape at room temperature; and a second driving unit adapted to be bent at a preset temperature or higher according to an electric signal supplied from an outside to adjust at least one of a direction and an angle of an object to be driven, which is coupled to the driving device.

The second driving may have a larger elastic force than the first driving unit in a superelasticity state.

The first driving unit may include any one of plate or ring-shaped carbon fiber reinforced plastic, high-elastic metal, polymer, and a polymer composite material, and the second driving unit may include a plate or ring-shaped shape memory alloy which maintains a memorized state in a superelasticity state at a preset temperature or higher.

A driving unit including the first driving unit and the second driving unit may be coupled to a panel of a flexible material.

The panel may be coupled to a light source which irradiates light.

A driving unit including the first driving unit and the second driving unit may be coupled to a light source which irradiates light.

The panel may be bent with contacting the first driving unit or the second driving unit.

The panel may be bent due to contraction and extension of the second driving unit.

The light source may include a surface light source or a plurality of light sources for each color.

The flexible driving device may further include: a sensing unit adapted to sense a movement or an environmental state around the driving device; and a control unit adapted to supply a current to the driving unit on the basis of attribute information on a movement or an environmental state sensed by the sensing unit so that the second driving unit has a higher elasticity than the first driving unit.

The sensing unit may include any one of an illumination sensor, a temperature sensor, and an ultraviolet sensor, and the control unit may adjust a magnitude of current input to the second driving unit on the basis of a value sensed by the sensing unit.

The sensing unit may include any one of a proximity sensor, an operation recognition sensor, and an infrared sensor, and the control unit may turn on/off a driving of the second driving unit on the basis of a value sensed by the sensing unit.

The flexible driving device may include: a sunlight receiving module, wherein the control unit may control the second driving unit to adjust an angle of the sunlight receiving module on the basis of an intensity of light sensed by the sensing unit.

The flexible driving device may further include: a communication unit which transmits and receives information to and from an external device, wherein the control unit may adjust a magnitude of the supplied current on the basis of command information received from the external device.

The control unit may include a printed circuit board having at least one slot formed therein, into which the first driving unit and the second driving unit are inserted.

Advantageous Effects

According to the flexible driving device of the present invention, it is possible to variously adjust the direction and angle of the object to be driven, which is coupled to the driving device.

In addition, according to the flexible driving device of the present invention, it is possible to install the driving device at different places by changing the shape thereof Further, another object of the present invention is accomplished by the flexible driving device which is capable of changing brightness and an angle of a light source or a panel to optimal brightness and direction on the basis of a user's movement and surrounding environmental information.

Furthermore, according the present invention, it is possible to change the brightness and angle of the light source or the panel according to the command received from the outside.

BEST MODE

Hereinafter, a flexible driving device according to the present invention will be described in detail with reference to the accompanying drawings.

The flexible driving device according to the present invention includes a first driving unit and a second driving unit. The first driving unit is adapted to maintain a specific shape at room temperature. The first driving unit according to the present invention may be made of any one of carbon fiber reinforced plastic, high elastic metal, polymer, and a polymer composite material. The second driving unit is adapted to be bent at a preset temperature or higher according to an electric signal supplied from an outside to adjust at least one of a direction and an angle of the object to be driven coupled to the driving device. The second driving unit according to the present invention may include a shape memory alloy, and preferably has superelasticity so as to return to a memorized shape at a specific temperature or higher.

The shape memory alloy included in the second driving unit according to the present invention may be made of nitinol containing titanium (Ti) and nickel (Ni) as a main element, or may use an alloy of Cu—Zn—Ni, Cu—Zn—Al, Cu—Al—Ni, Ag—Ni, Au—Cd, or the like which is classified into nickels (Ni), coppers (Cu), or irons (Fe) shape memory alloy, etc., and is a combination of metals such as zinc (Zn), aluminum (Al), gold (Au), or silver (Ag), etc. in detail.

In this case, for the shape memory alloy according to the present invention to have superelasticity at room temperature or higher, a temperature in which the superelasticity is exerted may be appropriately adjusted according to the used environment.

Thereby, the flexible driving device according to the present invention may adjust at least one of the direction and angle of the object to be driven coupled to the driving device according to the electric signal supplied from the outside.

Herein, the object to be driven coupled to the driving device may include a light source irradiating light or a panel of a flexible material. That is, the flexible driving device according to the present invention may be coupled to a lighting device irradiating light to adjust an irradiation position and an irradiation direction of light, and may be coupled to a panel on which advertising information, etc. is displayed to display information around the device in a form suitable for users.

Figure 1A:
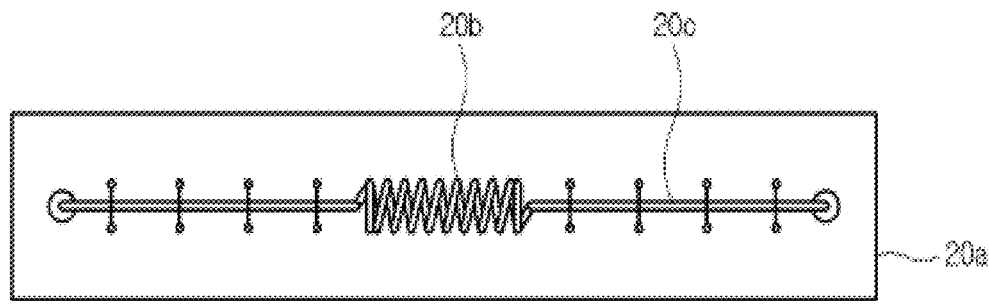
FIG. 1A is a plan view illustrating a flexible driving device according to an embodiment of the present invention.
Figure 1B:
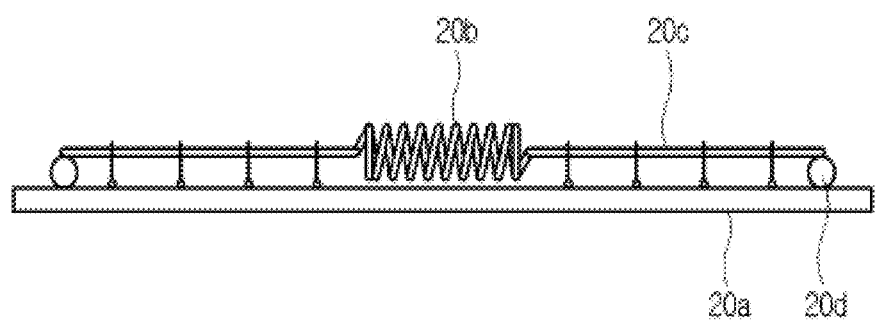
FIG. 1B is a side view illustrating the flexible driving device according to the embodiment of the present invention.

FIGS. 1A and 1B are a plan view and a side view illustrating the flexible driving device according to an embodiment of the present invention. As illustrated in FIGS. 1A and 1B, a second driving unit 20b according to the present invention may be formed by a spring, and may include wires 20c whose one end is connected to opposite ends of the spring and the other end is coupled to a plate-shaped first driving unit 20a, respectively. Portions between the opposite ends of the wires 20c may be coupled to the first driving unit 20a by strings for fixing the wires 20c through a plurality of holes formed in the first driving unit 20a, and the other ends of the wires 20c may be coupled to the first driving unit 20a by a pair of bars 20d.

When a current is applied to the spring-shaped second driving unit 20b, the spring of the second driving unit 20b is contracted to pull the wires 20c, and therefore the first driving unit 20a is bent in a direction in which the second driving unit 20b is positioned, such that the object to be driven coupled to the first driving unit 20a side may also be bent.

Figure 2A:
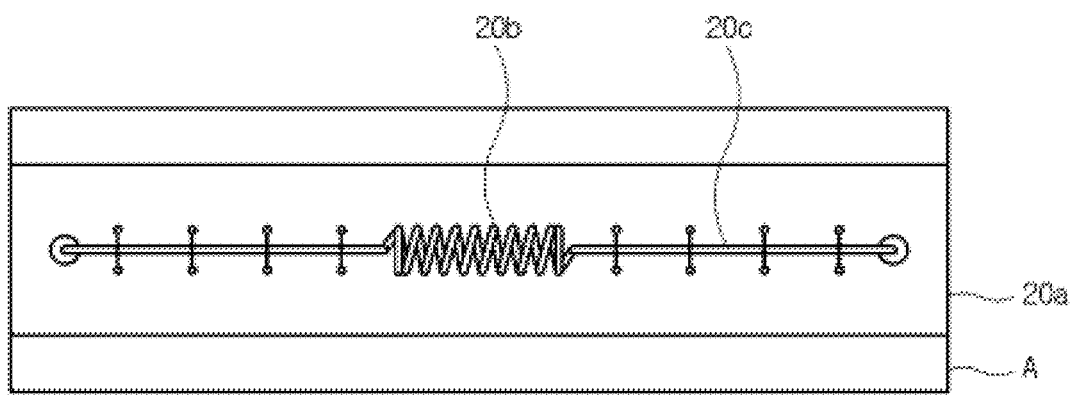
FIG. 2A is a plan view illustrating the flexible driving device according to the present invention with being coupled to a panel.
Figure 2B:
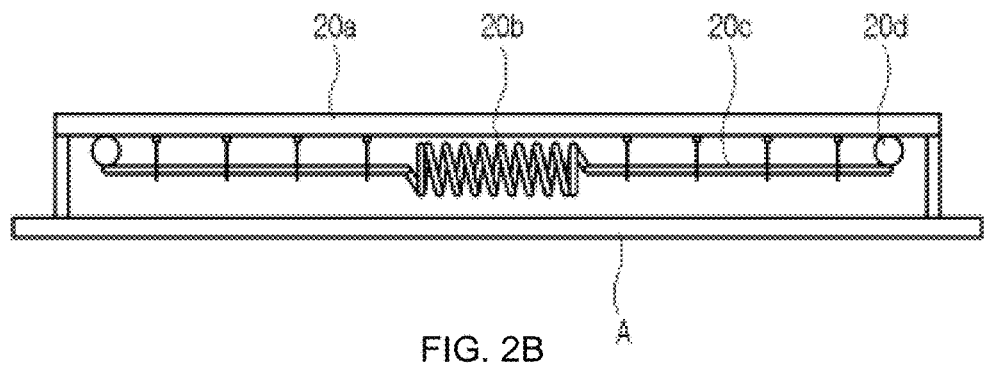
FIG. 2B is a side view illustrating the flexible driving device according to the present invention with being coupled to the panel.

FIGS. 2A and 2B are a plan view and a side view illustrating the the flexible driving device according to the present invention with being coupled to a panel. In the flexible driving device according to the present invention, as illustrated in FIG. 2A, the first driving unit 20a may be directly coupled to an assistance panel A, and as illustrated in FIG. 2B, the assistance panel A may be connected to the first driving unit 20a through separate connection members.

Figure 3A:
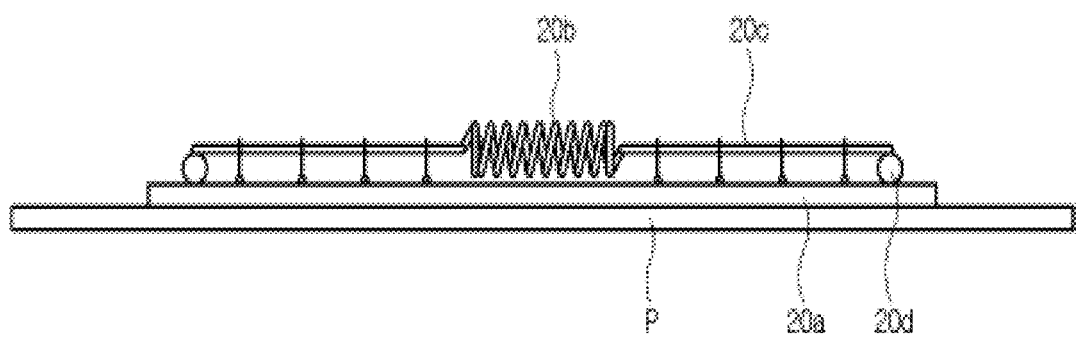
FIGS. 3A to 3D are views for describing types in which the flexible driving device according to the present invention may be changed by being coupled to an object to be driven.
Figure 3B:
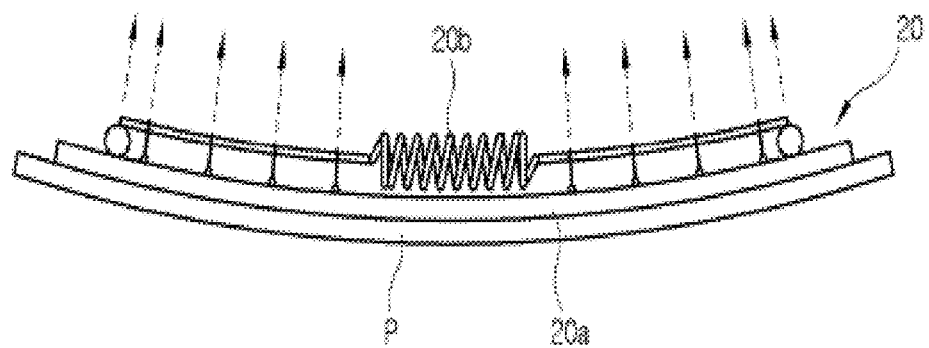
Figure 3C:
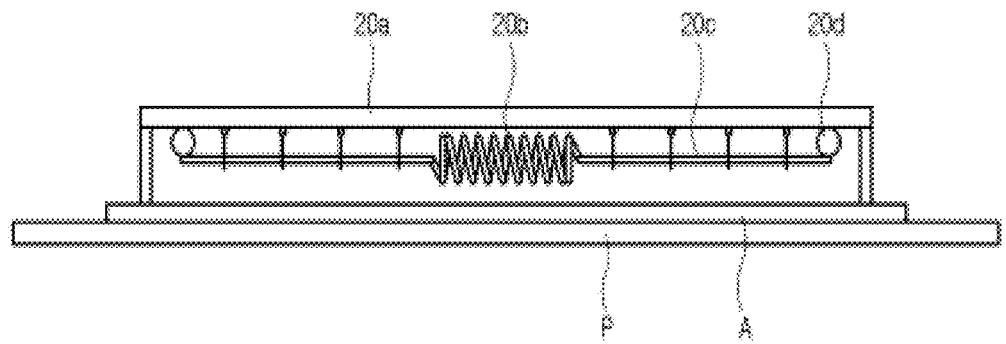
Figure 3D:
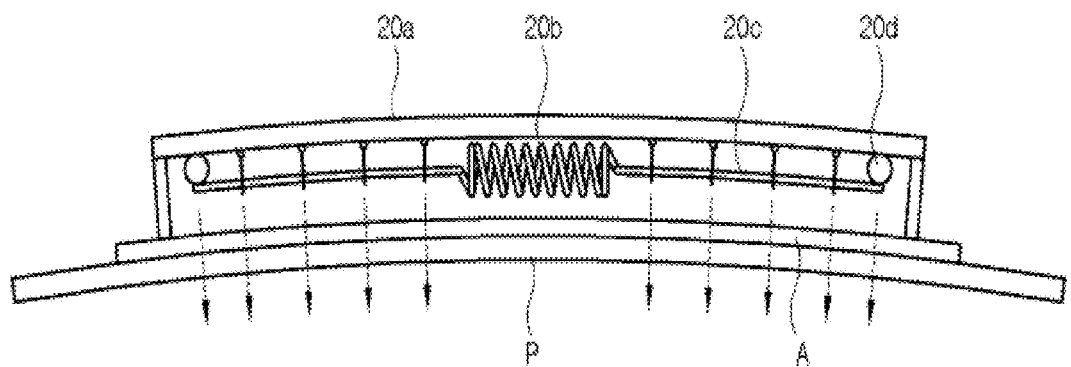

FIGS. 3A to 3D are views for describing types in which the flexible driving device according to the present invention may be changed by being coupled to an object to be driven. When the flat-shaped first driving unit 20a of the flexible driving device according to the present invention is directly coupled to a panel P which is the object to be driven as illustrated in FIG. 3A, the second driving unit 20b is contracted as illustrated in FIG. 3B, and thereby a display unit of the panel P may be bent to protrude outward of the device. Meanwhile, when the panel P is coupled to the device on the second driving unit 20b side by the assistance panel A to which the first driving unit is connected through the separate connection members as illustrated in FIG. 3C, the display unit may be bent to protrude inward of the device as illustrated in FIG. 3D.

That is, in the flexible driving device according to the present invention, it is possible to set a direction in which the object to be driven is bent in various ways by varing an orientation of the device coupled to the object to be driven. FIGS. 3A to 3D illustrate the case in which the second driving unit 20b has a spring shape as an example. However, even when the second driving unit 20b has a flat shape, the direction in which the object to be driven is bent may be variously changed according to types of the driving unit which is coupled to the object to be driven.

Figure 4A:
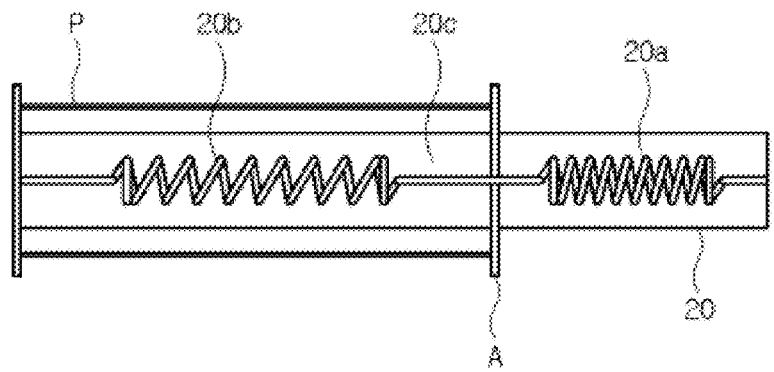
FIGS. 4A to 4C are views for describing a process of changing an appearance of the object to be driven by the flexible driving device according to the present invention.
Figure 4B:
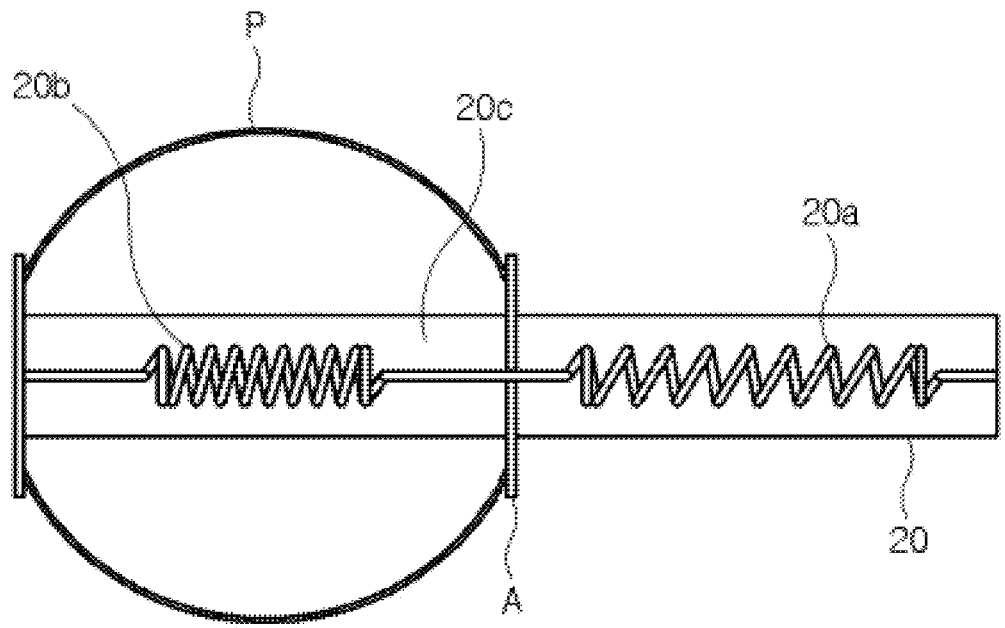
Figure 4C:
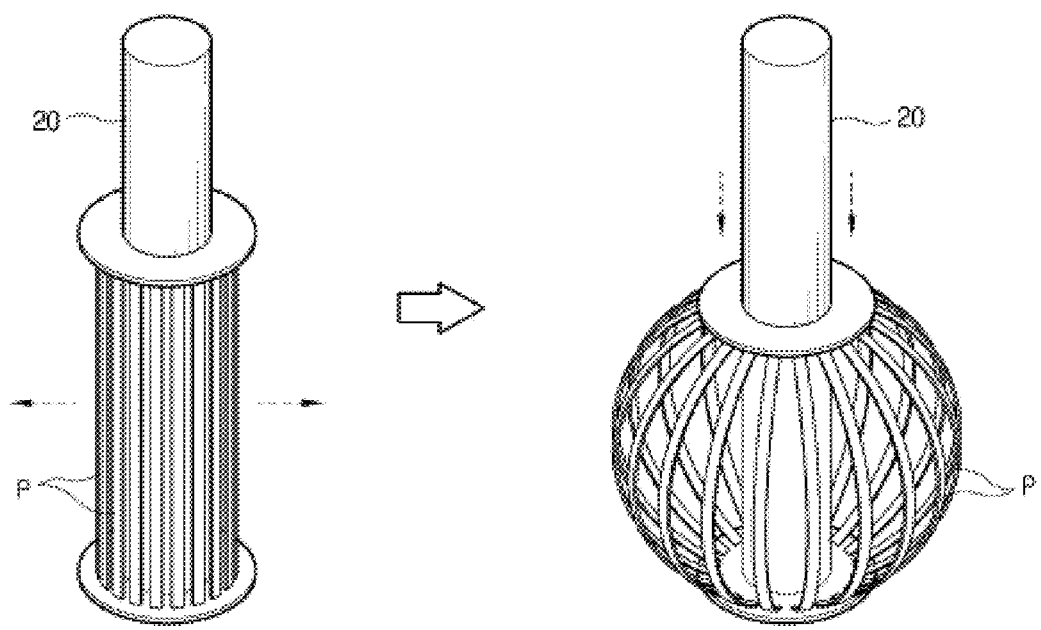

FIGS. 4A to 4C are views for describing a process of changing an appearance of the object to be driven by the flexible driving device according to the present invention. As illustrated in FIG. 4A, in a driving unit 20 of the flexible driving device according to the present invention, the first driving unit 20a and the second driving unit 20b have a spring shape, respectively, and are connected to each other in series through the wire 20c. The driving unit 20 has the panel P formed at the outside thereof, and one end of the panel P is vertically coupled to the assistance panel A.

Herein, the first driving unit 20a and the second driving unit 20b are springs having different characteristics from each other, and the first driving unit 20a always has elasticity even at room temperature. Thus, if a power is not supplied to a flexible driving device 100, the second driving unit 20b in a flexible state is extended, and the panel P becomes an unfolded state as a whole.

In this state, if the power is supplied to the flexible driving device 100 according to the present invention, as illustrated in FIG. 4B, the second driving unit 20b generates heat to be contracted in a prememorized shape, and since the second driving unit 20b has a larger elasticity than the first driving unit 20a, the panel P is bent to be changed to a circular shape while the assistance panel A moves to a left.

FIG. 4C is a perspective view of the panel P coupled to the driving unit 20. When a power supply is turned on, the shape of the panel P coupled to the driving unit 20 according to the present invention is changed while the second driving unit 20b is contracted, while when the power supply is turned off, the second driving unit 20b is extended, and thus the panel P may be unfolded. Herein, when the light source is coupled to the driving unit 20 or the panel P according to the present invention, the light source may serve as a dynamic lighting device of which the shape is changed according to the turn on/off of the power supply.

Figure 5A:
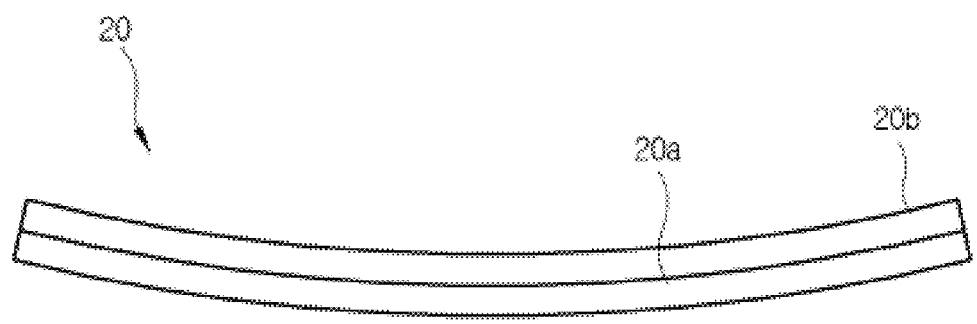
FIGS. 5A and 5B are side views illustrating a flexible driving device according to another embodiment of the present invention with being bent.
Figure 5B:
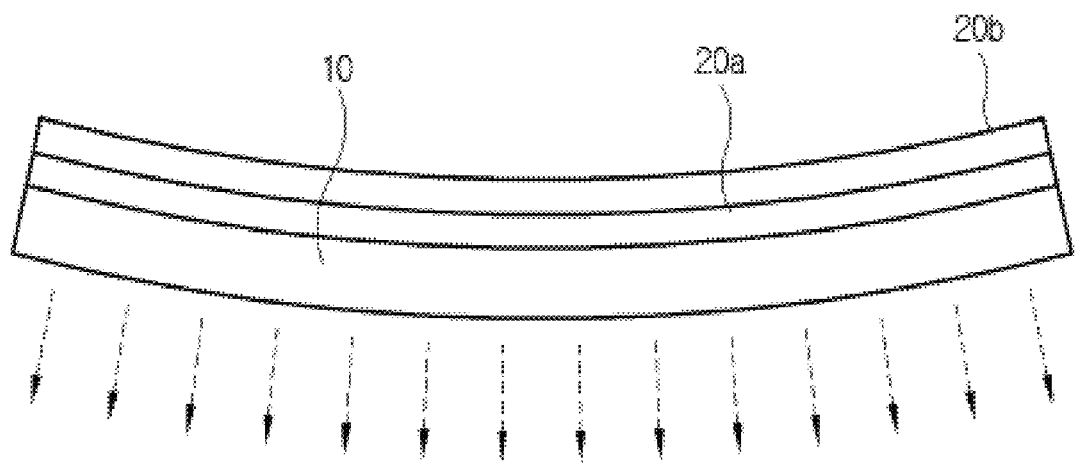

FIGS. 5A and 5B are side views illustrating a state in which a flexible driving device according to another embodiment of the present invention is bent. As illustrated in FIG. 5A, in the flexible driving device according to another embodiment of the present invention, both of the first driving unit 20a and the second driving unit 20b may be formed in a plate shape. Herein, when the first driving unit 20a according to the present invention is made of carbon fiber reinforced plastic, the shape of the device is mainained by the first driving unit 20a due to an elastic force exerted by the superelasticity thereof, and the second driving unit 20b becomes a flat shape as a whole by losing the elasticity at room temperature. In this case, if a current is supplied to the carbon fiber reinforced plastic, heas is generated by the carbon component, and thereby it is possible to maintain a temperature in which the shape memory alloy has the superelasticity or higher without a separate configuration for generating heat.

Further, if the temperature of the second driving unit 20b is 50° C. or higher due to the current supplied thereto, both of the first driving unit 20a and the second driving unit 20b have superelasticity, but since the second driving unit 20b has a larger elasticity than the first driving unit, both units are bent. If the first driving unit 20a according to the invention is made of the shape memory alloy like the second driving unit 20b, the bent shape thereof may be maintained due to a difference in elastic force between the first driving unit 20a and the second driving unit 20b. FIG. 5B is a side view illustrating an embodiment of a flexible lighting device in which both of the first driving unit 20a and the second driving unit 20b have a plate shape, and an object 10 to be driven is implemented by a surface light source.

Meanwhile, in order to effectively generate heat with minimum power, it is preferable that the first driving unit 20a and the second driving unit 20b of the driving device according to the present invention are subjected to heat coating on a surface of the spring or at least one surface of the flat-shaped plate. Also, in order to achieve rapid heat generation and cooling, save material costs, or the like, the second driving unit 20b may be embedded in the first driving unit 20a or may be fixed between the first driving unit 20a and the panel P.

Figure 6:
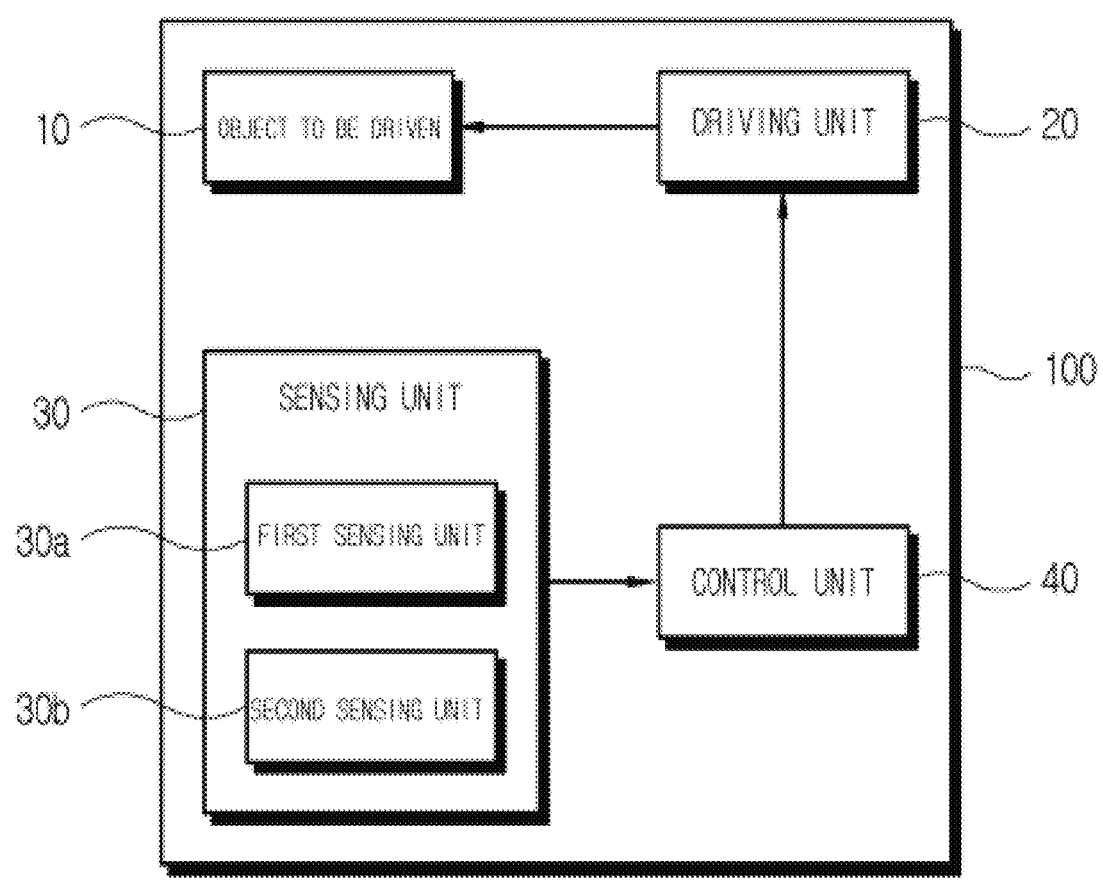
FIG. 6 is a block diagram illustrating a configuration of the flexible driving device according to the present invention.

FIG. 6 is a block diagram illustrating a configuration of the flexible driving device according to the present invention. As illustrated in FIG. 6, the flexible driving device 100 according to the present invention includes the object 10 to be driven, the driving unit 20, a sensing unit 30, and a control unit 40.

The object 10 to be driven is coupled to the driving unit 20 including the first driving unit 20a and the second driving unit 20b. The object 10 to be driven according to the present invention may include the light source irradiating light to an object to be irradiated or the panel P on which advertising information, or the like is displayed.

The light source according to the present invention may implemented by various types of light emitting elements such as LEDs, OLEDs, or the like, and may be implemented by at least one surface light source. The light source according to the present invention may be coupled to the driving unit 20 or the panel P, and one driving unit 20 may include a plurality of light sources according to a size of the driving unit 20 or the panel P. When the plurality of light sources are coupled to the driving unit 20 or the panel P, the driving unit may include light sources corresponding to various colors.

Further, the light source may include a transmission layer (not illustrated) through which light irradiated by the light source is transmitted, which is formed on one side thereof. Illumination of light irradiated by the light source may be adjusted according to transmittance transmitting light.

Further, when the driving unit 20 according to the present invention is configured to maintain a ring shape at a specific temperature, the light irradiated from the light source may be shielded.

The driving unit 20 is coupled to the object 10 to be driven, and is bent at a preset temperature or higher according to an electric signal supplied from the outside to adjust at least one of a direction and an angle of the object to be driven coupled to the driving device. To this end, the driving unit 20 according to the present invention includes the shape memory alloy which allows the device to be maintained in a specific shape at room temperature and to be bent at the preset temperature or higher according to the electric signal supplied from the outside. Therefore, a shape or direction in which the object to be driven is bent may be variously set by varying a superelastic size of the shape memory alloy according to a heat quantity generated by a supply of current.

When the driving device according to the present invention is coupled with the light source to serve as the lighting device, the driving device may be provided with a separate coupling part (not illustrated) to be coupled to a ceiling or a wall, and may be provided with a support member (not illustrated) to be implemented as a stand type device, and the driving device may be implemented for a portable application due to being bent in a shape or size to be carried.

The sensing unit 30 is adapted to sense a movement or an environmental state around the driving device. The sensing unit 30 according to the present invention may be installed outside the driving device to transmit the sensed information to the driving device.

The sensing unit 30 according to the present invention may include a first sensing unit 30*a* adapted to sense the environmental state around the driving device and a second sensing unit 30*b* adapted to sense the movement around the driving device.

Herein, the first sensing unit 30*a* for sensing the environmental state around the driving device may include any one of an illumination sensor, a temperature sensor, and an ultraviolet sensor, and the second sensing unit 30*b* for sensing the movement around the driving device may include any one of a proximity sensor, a motion recognition sensor, and an infrared sensor.

More particularly, when the driving device according to the present invention is coupled with the light source to serve as a lighting device, on the basis of a brightness value sensed by the illumination sensor included in the first sensing unit 30*a*, a magnitude of current may be adjusted so that the driving device maintain the unfolded state in the daytime when the illumination is high, while a magnitude of voltage may be adjusted so that the shape of the driving device is changed to a curved surface according to the brightness at night when illumination is low.

Similarly, on the basis of a temperature value sensed by the temperature sensor included in the first sensing unit 30*a*, the magnitude of current may be adjusted so that the driving device according to the present invention maintains an unfolded state at a time zone or a place when or where an ambient temperature is high, while the magnitude of voltage may be adjusted so that the shape of driving device is changed to the curved surface at a time zone or a place when or where the ambient temperature is low.

In addition, on the basis of an ultraviolet value sensed by the ultraviolet sensor included in the first sensing unit 30*a*, the magnitude of current may be adjusted so that the driving device maintains the unfolded state at a time zone or a place when or where an ultraviolet index is high, while the magnitude of voltage may be adjusted so that the shape of driving device is changed to the curved surface at a time zone or a place when or where the ultraviolet index is low.

Further, when the movement around the driving device is sensed by any one of the proximity sensor, the motion recognition sensor, and the infrared sensor included in the second sensing unit 30*b*, the magnitude of current may be adjusted on the basis of the sensed movement so that the shape of the driving device according to the present invention is changed. More particularly, the second sensing unit 30*b* may sense a person's movement at a road side or a passage, a dressing table, a dress room, a toilet, etc. and the driving device receives the sensed information to adjust the magnitude of current on the basis of the movement information sensed by the second sensing unit 30*b* so that the shape of the driving device is temporarily changed.

The control unit 40 according to the present invention is adapted to supply a current to the driving unit 20 on the basis of attribute information on a movement or an environmental state around the driving device which is sensed by the sensing unit 30 so that the second driving unit 20*b* has a higher elasticity than the first driving unit 20*a*. To this end, the control unit 40 according to the present invention may include a rectifying unit rectifying AC power of 220V to DC power of 0 to 30V and a flexible printed circuit board supplying a current rectified by the rectifying unit to the driving unit. As described above, the control unit 40 may supply a current to the second driving unit 20*b* or supply a current to the first driving unit 20*a* of the carbon fiber reinforced plastic so that the second driving unit 20*b* may be in a flexible state and a high-elasticity state without a separate heater.

Herein, the printed circuit board included in the control unit 40 according to the present invention may have at least one slot formed therein, into which the first driving unit 20*a* and the second driving unit 20*b* are inserted. Thereby, other signals may be applied to the respective driving units coupled to the slots to implement various driving forms, and superelasticity conditions of the first driving unit or the second driving unit may be different from each other so as to achieve various driving forms even by the same signal.

Meanwhile, when the object to be driven according to various embodiments of the present invention is a panel, the panel may be coupled to a sunlight receiving module (not illustrated) to adjust the angle of the panel on the basis of an intensity of light sensed by the sensing unit 30. Further, when the object to be driven by the driving unit 20 is a light source, the control unit 40 may control the light source to adjust a luminous intensity of the light source on the basis of the brightness value sensed by the sensing unit 30.

Meanwhile, the control unit 40 according to the present invention may classify and store the movement and the environmental state sensed by the sensing unit 30 into a plurality of types, and may supply a current having a magnitude corresponding to each classified type to the first driving unit 20*a* and the second driving unit 20*b*.

Figure 7:
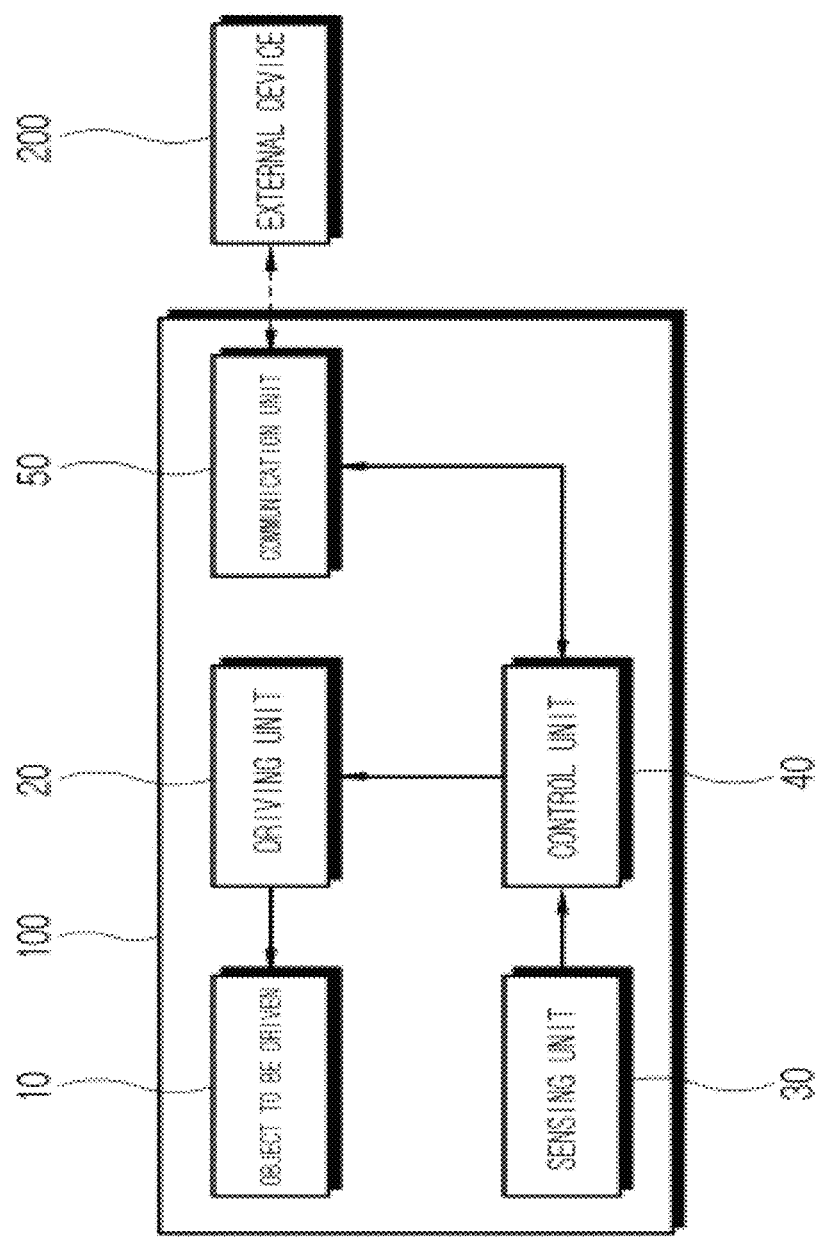
FIG. 7 is a block diagram illustrating a configuration of a flexible driving device according to another embodiment of the present invention.

Hereinafter, a flexible driving device 100 according to another embodiment of the present invention will be described with reference to FIG. 7. As illustrated in FIG. 7, the flexible driving device 100 according to another embodiment of the present invention further includes a communication unit 50 which transmits and receives information to and from an external device 200 and the control unit 40 may adjust a magnitude of the current supplied to the driving unit 20 on the basis of command information received from the external device 200.

Herein, the communication unit 50 receives command information on warpage of the driving unit 20 from the external device 200 by near field communication modules such as Bluetooth and Zigbee based on the control of the control unit 40. Thereby, the flexible driving device 100 according to the present invention may set the bent degree of the driving device according to user's setting independent of the environmental state or the movement around thereof. Preferably, the external device 200 may store at least one situation under which the flexible driving device 100 may be operated and a magnitude value of current corresponding thereto as the command information.

In this case, the external device 200 transmitting the command information to the flexible driving device 100 according to the present invention may include a remote controller or a smart phone, a tablet PC, or the like in which software or applications for transmitting the command information are installed.

Figure 8:
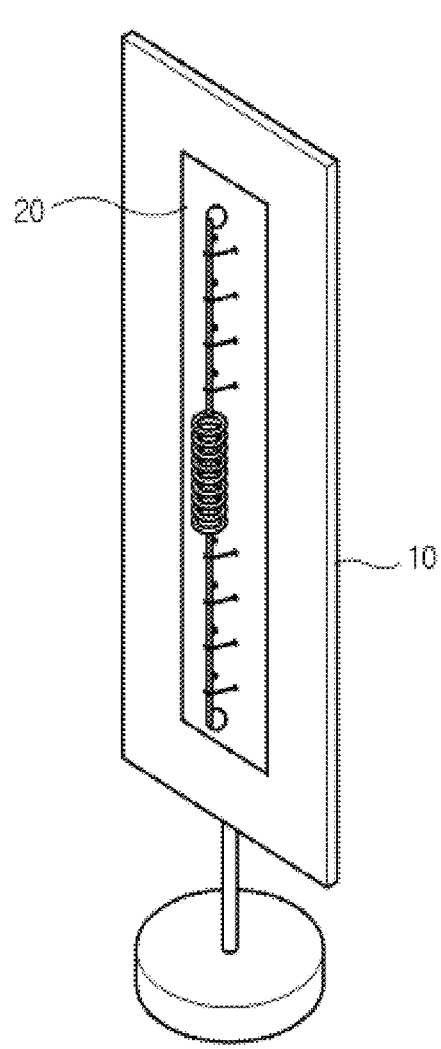
FIG. 8 is a perspective view illustrating a shape of the object to be driven to which the flexible driving device according to the present invention is coupled.

FIG. 8 is a perspective view illustrating a shape of a panel which is the object to be driven to which the flexible driving device according to the present invention is coupled. As illustrated in FIG. 8, the flexible driving device according to the present invention may be coupled to the panel of a flexible material to adjust an angle at which the panel is bent. Thereby, the information displayed on a front surface of the panel may be effectively provided to a pedestrian, or the like around the driving device.

FIG. 8 illustrates the case in which the object to be driven coupled to the driving device is an advertising panel as an example, but the panel which is the object to be driven may be implemented as portable fancy products such as an underlay or a case.

Figure 9A:
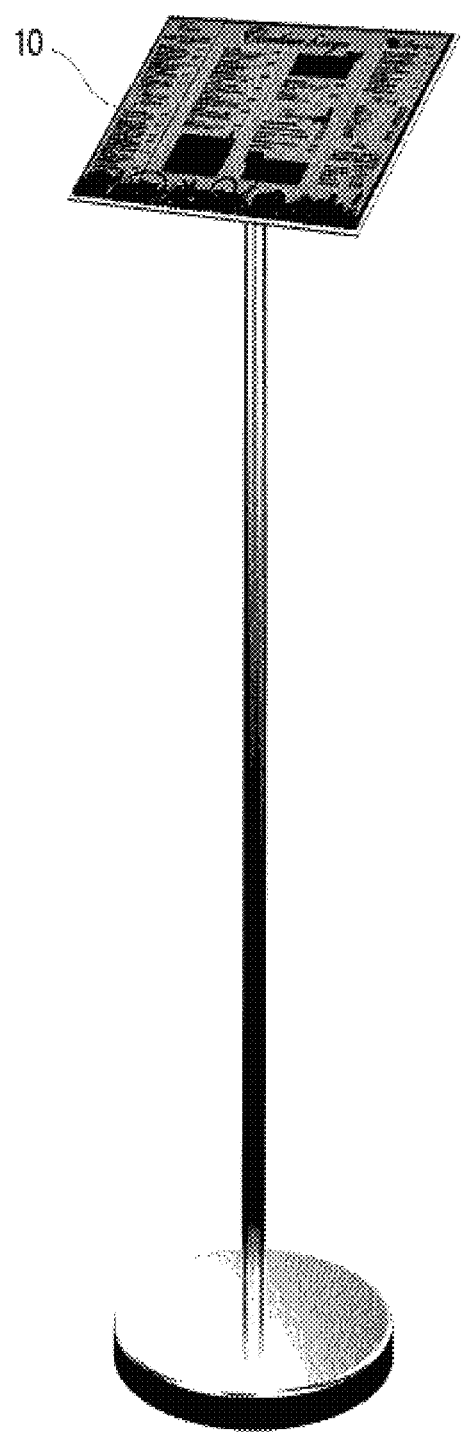
FIGS. 9A to 9D are perspective views illustrating another shape of the object to be driven to which the flexible driving device according to the present invention is coupled.
Figure 9B:
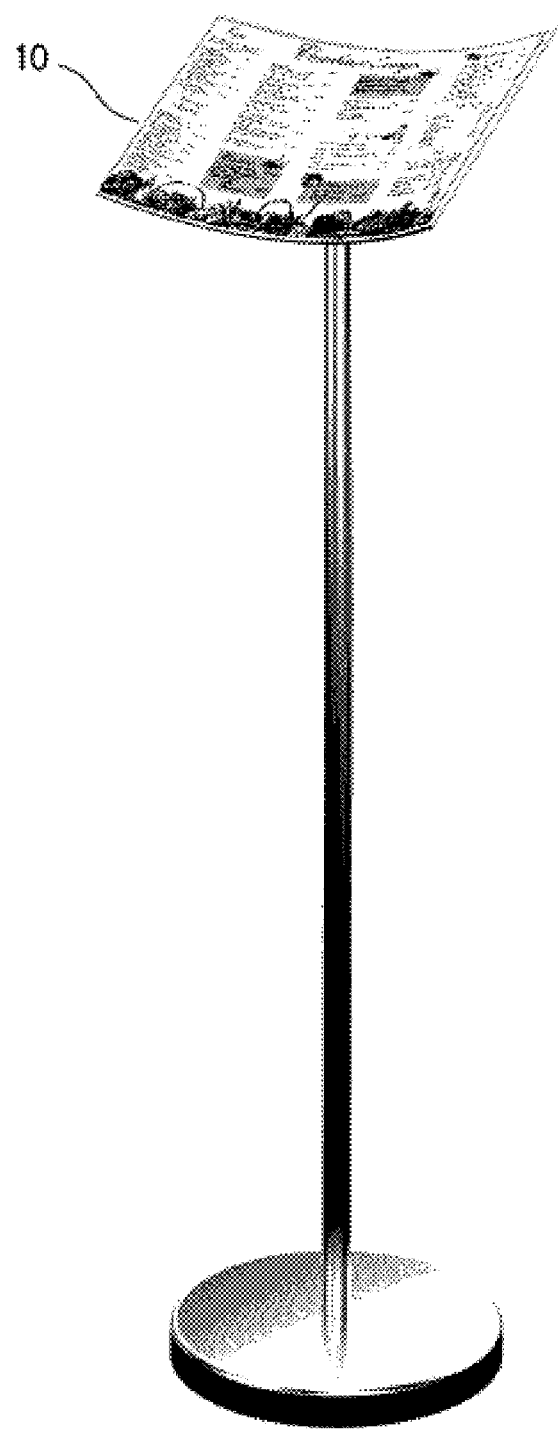
Figure 9C:
Figure 9D:
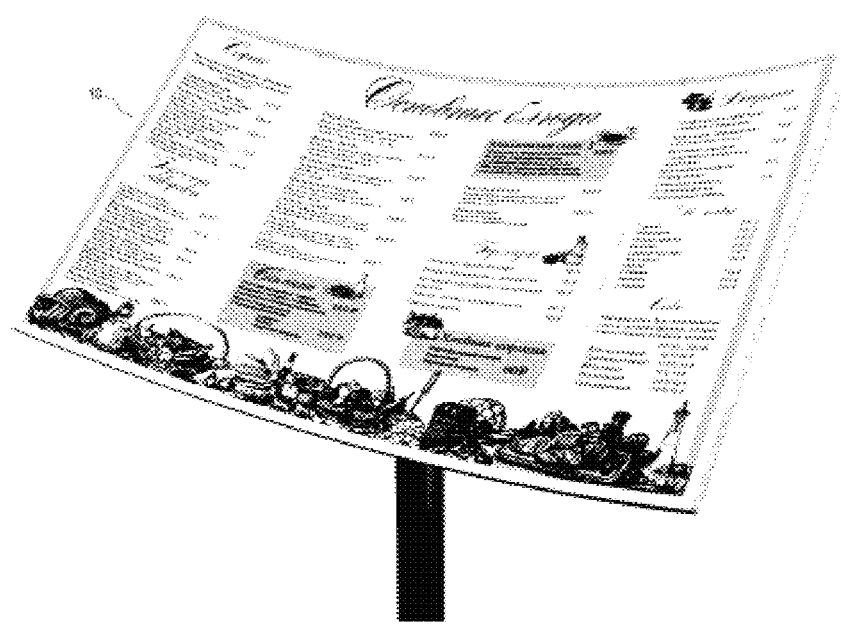

FIGS. 9A to 9D are perspective views illustrating another shape of the object to be driven to which the flexible driving device according to the present invention is coupled. The driving device according to the present invention may be coupled to the panel of a flexible material as described above to adjust the angle at which the panel is bent. The object to be driven having another form coupled to the driving device according to the present invention maintains the state in which the light source does not emit light in a flat shape when there is no person around the driving device as illustrated in FIG. 9A and the sensing unit 30 senses an approach of a person to allow the light source to emit light while the driving device is bent to a curved surface as illustrated in FIG. 9B, thereby turning on the lighting device. FIGS. 9C and 9D are enlarged views corresponding to FIGS. 9A and 9B, respectively.

While the present invention has been described with reference to the preferred embodiments, the present invention is not limited thereto, and it will be understood by those skilled in the related art that various modifications and variations may be made withing the scope of the present invention as defined by the appended claims.

The invention claimed is:

1. A flexible driving device, comprising:
a first driving unit adapted to maintain a specific shape at room temperature; and
a second driving unit having a coil spring shape and adapted to contract at a preset temperature or higher according to an electric signal supplied thereto,
wherein the second driving unit is flexible at room temperature to allow the second driving unit to be extended by the first driving unit, and
wherein the second driving unit has a larger elastic force than the first driving unit in a superelasticity state at the preset temperature or higher, causing the first driving unit to bend so as to adjust at least one of a direction and an angle of an object couled to the first driving unit.

2. The flexible driving device according to claim 1, wherein the first driving unit includes any one of plate or ring-shaped carbon fiber reinforced plastic, high-elastic metal, polymer, and a polymer composite material, and the second driving unit maintains a memorized state in the superelasticity state at the preset temperature or higher.

3. The flexible driving device according to claim 1, wherein a driving unit including the first driving unit and the second driving unit is coupled to a panel of a flexible material.

4. The flexible driving device according to claim 3, wherein the panel is coupled to a light source which irradiates light.

5. The flexible driving device according to claim 1, wherein a driving unit including the first driving unit and the second driving unit is coupled to a light source which irradiates light.

6. The flexible driving device according to claim 3, wherein the panel is bent due to a contraction of the first driving unit or the second driving unit.

7. The flexible driving device according to claim 4, wherein the panel is bent due to a contraction of the first driving unit or the second driving unit.

8. The flexible driving device according to claim 3, wherein the panel is bent due to contraction and extension of the second driving unit.

9. The flexible driving device according to claim 4, wherein the panel is bent due to contraction and extension of the second driving unit.

10. The flexible driving device according to claim 4, wherein the light source includes a surface light source or a plurality of light sources for each color.

11. The flexible driving device according to claim 5, wherein the light source includes a surface light source or a plurality of light sources for each color.

12. The flexible driving device of claim 3, further comprising:
a sensing unit adapted to sense a movement or an environmental state around the driving device; and
a control unit adapted to supply a current to the driving unit on the basis of attribute information on a movement or an environmental state sensed by the sensing unit so that the second driving unit has a higher elasticity than the first driving unit.

13. The flexible driving device of claim 4, further comprising:
a sensing unit adapted to sense a movement or an environmental state around the driving device; and
a control unit adapted to supply a current to the driving unit on the basis of attribute information on a movement or an environmental state sensed by the sensing unit so that the second driving unit has a higher elasticity than the first driving unit.

14. The flexible driving device of claim 5, further comprising:
a sensing unit adapted to sense a movement or an environmental state around the driving device; and
a control unit adapted to supply a current to the driving unit on the basis of attribute information on a movement or an environmental state sensed by the sensing unit so that the second driving unit has a higher elasticity than the first driving unit.

15. The flexible driving device according to claim 12, wherein the sensing unit includes any one of an illumination sensor, a temperature sensor, and an ultraviolet sensor, and the control unit adjusts a magnitude of current input to the second driving unit on the basis of a value sensed by the sensing unit.

16. The flexible driving device according to claim 15, wherein the sensing unit includes any one of a proximity sensor, an operation recognition sensor, and an infrared sensor, and the control unit turns on/off a driving of the second driving unit on the basis of a value sensed by the sensing unit.

17. The flexible driving device according to claim 15, further comprising: a sunlight receiving module,
wherein the control unit controls the second driving unit to adjust an angle of the sunlight receiving module on the basis of an intensity of light sensed by the sensing unit.

18. The flexible driving device according to claim 15, further comprising:
a communication unit which transmits and receives information to and from an external device,
wherein the control unit adjusts a magnitude of the supplied current on the basis of command information received from the external device.

19. The flexible driving device according to claim 15, wherein the control unit includes a printed circuit board having at least one slot formed therein, into which the first driving unit and the second driving unit are inserted.

20. A flexible driving device, comprising:
a first driving unit having a flat plate shape at room temperature;
a second driving unit having a flat plate shape at room temperature, a bottom surface of the second driving unit being secured to a top surface of the first driving unit; and
an object having a top surface that is secured to a bottom surface of the first driving unit,
wherein the second driving unit deformes differently from the first driving unit at a preset temperature or higher in reponse to an electric signal supplied from an outside, to thereby cause all of the first driving unit, second driving unit, and the object to bend convex toward a bottom surface of the object.

* * * * *